(No Model.)

J. A. POTTER.
FORGING PRESS.

No. 601,082. Patented Mar. 22, 1898.

WITNESSES

INVENTOR
John A. Potter
by Bakewell & Bakewell
his Attorneys.

UNITED STATES PATENT OFFICE.

JOHN A. POTTER, OF CLEVELAND, OHIO.

FORGING-PRESS.

SPECIFICATION forming part of Letters Patent No. 601,082, dated March 22, 1898.

Application filed January 21, 1897. Serial No. 620,135. (No model.)

*To all whom it may concern:*

Be it known that I, JOHN A. POTTER, of Cleveland, in the county of Cuyahoga and State of Ohio, have invented a new and useful Improvement in Forging-Presses, of which the following is a full, clear, and exact description, reference being had to the accompanying drawings, forming part of this specification, in which—

Figure 1:
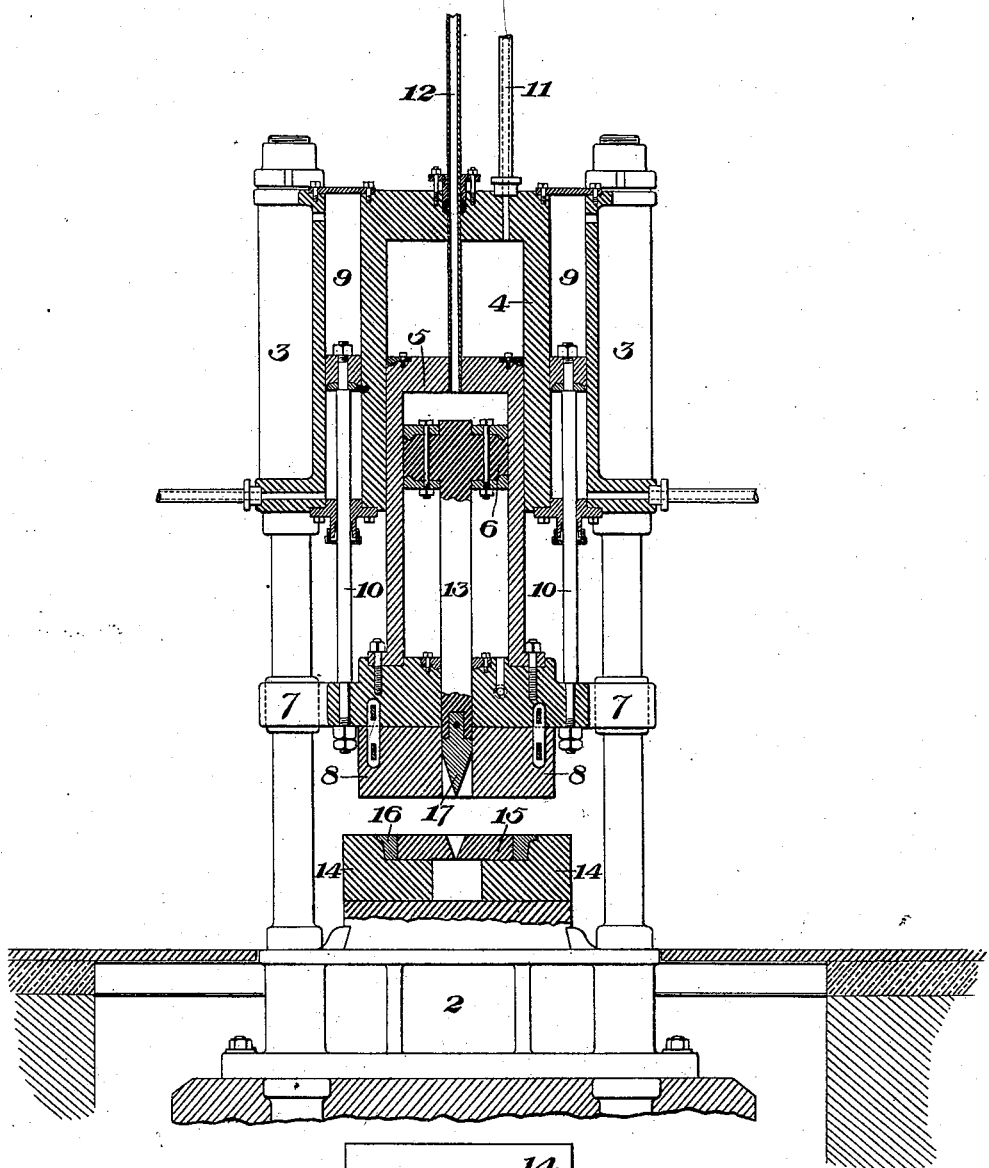
Figure 2:
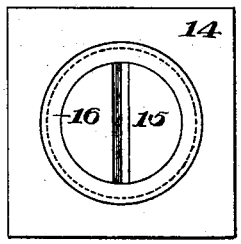

Figure 1 is a front elevation, partly in section, of a hydraulic press constructed in accordance with my invention. Fig. 2 is a plan view of the bottom die with the tire or rim set therein.

In the drawings, in which similar numerals indicate corresponding parts, Figure 1 shows a forging-press having the usual base-plate 2, the standards 3, and the motive cylinder 4, carried between said standards. Movable within this cylinder is a plunger 5, which is hollow and itself serves as a cylinder for an inner plunger 6, arranged to reciprocate therein. Fixed to the lower end of the plunger 5 is a cross-head 7, to which is secured a die or hammer 8. This cross-head is drawn upwardly after each stroke by two cylinders 9 9, whose piston-rods 10 are secured to the cross-head. Water is supplied to the cylinder 4 by the pipe 11 and to the interior of the plunger 5 by a pipe 12, which is secured to the upper end of the outer plunger and moves therewith. The inner plunger is provided with a projecting post 13, which extends through a hole in the cross-head and die, as shown.

14 is a bed-die or anvil against which the moving die 8 works and the matrix of which is of proper form and size to form the article to be made therein (where the dies are used for giving an article its first form) or for receiving the article, (where the dies are used for finally treating an already-formed and reheated article.) In the apparatus as shown in the drawings I show the die or anvil 14 holding a car-wheel tire 16, within which are placed laterally-movable compressing-cores 15. In operating upon this tire the die 8 is forced downwardly upon the same, and the tire being held firmly in place the plunger 6, is moved downwardly, and the expanding-tool 17 being forced between the movable sections 15 causes these sections to move outwardly and compress the tire. The shape and size of the dies carried by the two plungers and by the bed-plate may be varied as desired to suit the article, and either liquid or reheated steel may be treated in the press. Articles of many different varieties may be made in this manner—for example, car-wheels, flanges, couplings, &c., in the manufacture of projectiles with a hard exterior and soft interior or with a soft exterior and hard interior, or in forgework of all characters, such as eyebars, &c. If desired, also, the interior die may be used to force into an article compressed by the outer die a solid core or other cold-metal piece which is to be left in the article. This is done by loosely attaching such core to the end of the inner die. Other modifications and uses of the apparatus will suggest themselves to those skilled in the art to which the invention relates. For example, the plunger 6 can be taken out of the plunger 5 and a plunger of smaller diameter placed therein, which would enable lighter articles to be forged with a less amount of water-pressure.

I claim—

1. A press having a hollow plunger carrying a cross-head, a die or hammer secured to said cross-head, a second plunger movable within the hollow plunger and extending through the cross-head and hammer, and an expanding-tool carried by the inner plunger and arranged to force movable cores outwardly in the mold.

2. A press having a hollow plunger carrying a cross-head, a die or hammer secured to said cross-head, motive cylinders arranged to raise the cross-head and plunger into normal position, a plunger movable within the above-named hollow plunger, and a tool carried thereby, said tool being movable through a hole in the cross-head and die carried by the outer plunger.

In testimony whereof I have hereunto set my hand.

JOHN A. POTTER.

Witnesses:
JOHN H. NEWEY,
FRED. H. HART.